Figure 1:
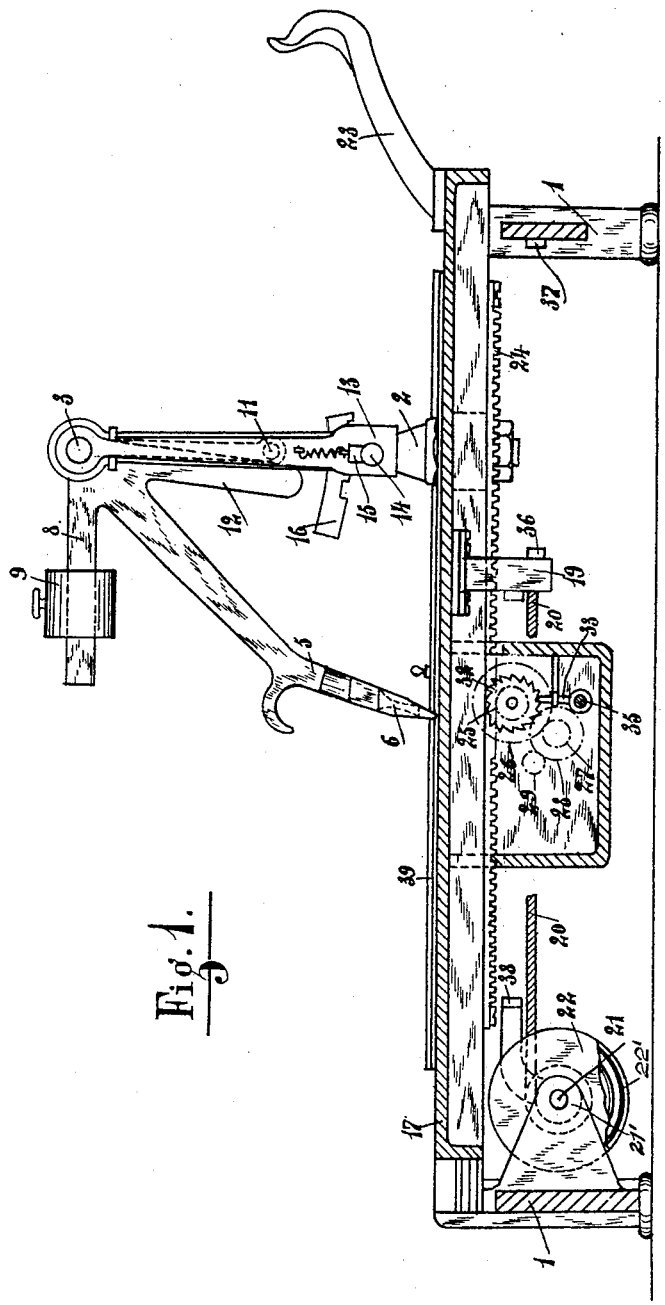

UNITED STATES PATENT OFFICE.

JOSEPH DENOËL, OF LEMBECQ, BELGIUM.

APPARATUS FOR TESTING THE SIZING OF PAPER.

1,404,586.  Specification of Letters Patent.  Patented Jan. 24, 1922.

Application filed November 22, 1920. Serial No. 425,852.

*To all whom it may concern:*

Be it known that I, JOSEPH DENOËL, a citizen of the Kingdom of Belgium, and resident of Lembecq, Belgium, have invented certain new and useful Improvements in Apparatus for Testing the Sizing of Papers, (for which I have filed applications in Belgium on November 6, 1919, and in Germany on November 19, 1919;) and I do hereby declare the following to be a full, clear, and exact description of the invention, such as will enable others skilled in the art to which it appertains to make and use the same, reference being had to the accompanying drawings, and to figures of reference marked therein, which form a part of this application.

Experiments have proved that for testing the sizing of papers the process consisting of drawing strokes on the paper to be tested, by means of a pen or a drawing-pen, is capable of giving good results, but up to the present time these tests were made by hand, so that the results of the tests were not absolute, but depended on the skill of the operator, the inclination of the drawing-pen, the pressure of the latter on the paper, the amount of ink brought into the drawing-pen, and the speed of the work.

The unreliablity of the hand test is avoided according to the present invention by the use of a board on which the paper to be tested is secured and of a frame supporting one or more drawing-pens, the points of which are pressed into contact with the paper, means being provided for moving either the board or the frame with respect to the other for drawing strokes on the paper.

The drawings show by way of example an embodiment of the invention.

Figure 2:
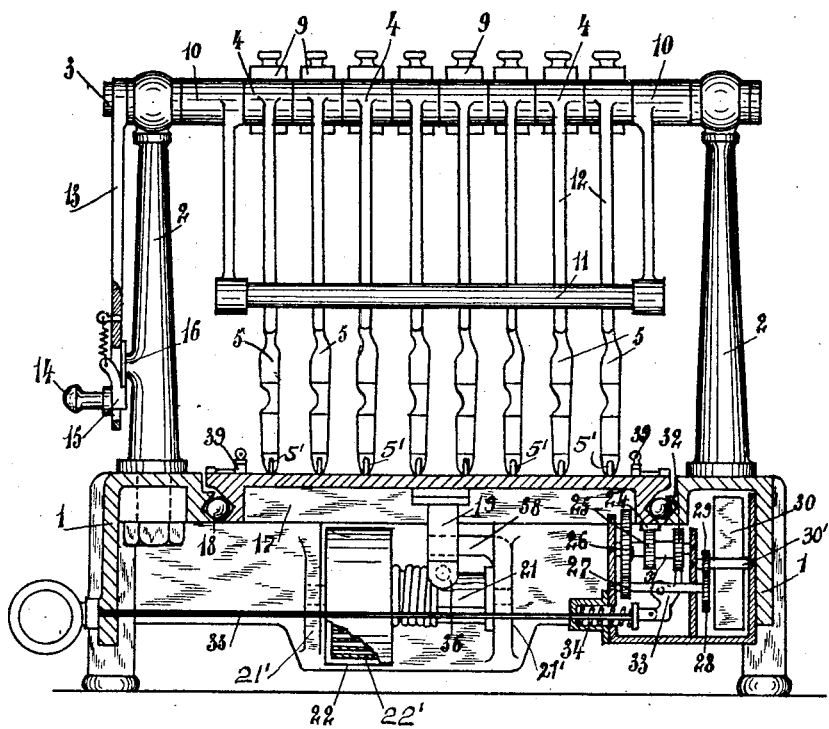

Fig. 1 is a side view and Fig. 2 a rear view of the apparatus, the base of the apparatus and the movable board being shown in section.

The apparatus comprises a base 1 on which are mounted two posts 2 in the upper portion of which a rotary axle 3 is supported. Upon said axle are loosely fitted sleeves 4, eight in number in the example shown, which are integral with the stems of the drawing-pens 5. At the lower end of said drawing-pens are provided two points, the distance between the points of successive pens increasing from left to right, so that each pen will draw a line of different breadth. The space between the two points of each pen communicates with an ink-reservoir 6. The inclination of all the drawing-pens is the same. Each of these drawing-pens is provided with a horizontal arm 8 carrying a slidable weight 9, which may be suitably retained in adjusted position in order to press the drawing-pen on the paper.

Upon the rotary axle 3 are secured the two sleeves 10 which support the lifting bar 11 which rests against the arms 12. For the operation of this bar 11, the axle 3 has fixed to it an operating lever 13 provided with a sliding catch 15 having a finger-piece or button 14, said catch coacting with a notched bar 16 fixed to the post 2. For simultaneously raising the drawing-pens, it is only necessary to move the lever 13 to the left (Fig. 1) until the spring catch 15 comes in engagement with the notch of the bar 16.

The movable board 17 is guided in the base 1 by means of balls 18 held in suitable races or tracks formed jointly in both board and base. The board is provided with an arm 19 to which is secured the one end of a cable 20 the other end of which is secured to an axle 21 journaled in suitable bearings 21' carried by the base 1. A spiral spring 22' enclosed in the drum 22 is also mounted on said axle 21. When the board is moved to the right for instance by operating the handle 23, the spiral spring is wound up and has a tendency to draw the board to the left as soon as the board is released. For regulating the return movement, the board 17 is provided with a rack 24 in mesh with a pinion 25, which in turn is connected by a train of gears 26, 27, 28, 29 to rotate a shaft 30' journaled in the base 1 and carrying a governor 30. In order that the governor may exert its action only during the return movement of the board, a one-way clutch can be mounted in the hub 31 of the pinion 25, in such a way that said pinion is only coupled with the gear train during that movement of the board and is uncoupled during the forward movement of the board.

Upon the hub of the pinion 25 is also mounted a ratchet-wheel 32 which is normally engaged by a stop pawl 33, whereby said wheel and, hence, the pinion 25 and the gear train are held against movement. Pawl 33 is pivotally connected to a releasing rod 35 which carries a spring 34, the latter serving to yieldingly maintain said pawl in its engaged position; but the pawl can be readily disengaged by pulling rod 35 to the left, whereupon the board will be released and will commence its movement under the influence of the spring drum. In order to limit the movements of the movable board, the arm 19 is provided with two lugs 36 which come into contact with fixed abutments 37, 38.

In operation, a sheet of paper is fixed on the board by means of the spring clamps 39. While the drawing-pens are in the raised position, the reservoirs 6 are filled with ink. The board is then drawn back to the right (Fig. 1) until the right-hand lug 36 on arm 19 is in contact with the abutment 37 and the board is stopped in this position by the pawl 33. With the one hand the operator lets the drawing-pens fall upon the paper by actuating the lever 13 and with the other hand he pulls out the rod 35 so as to disengage pawl 33 from ratchet 32 and thus release the spring drum. The different drawing-pens are then caused to draw lines regularly on the paper by the slow movement of the board to the left. At the end of the movement, the handle 23 comes into contact with the lifting bar 11 and automatically raises it and, with it the drawing-pens, until the spring catch 15 engages with the notch of the sector 16.

The sheet of paper is then taken off the board and allowed to dry before making the necessary calculations. This sheet is provided with strokes of equal length, the breadth of which increases regularly according to the different distances between the points in each of the drawing-pens; the breadth can for instance increase regularly from $\frac{1}{2}$ millimeter to $2\frac{1}{4}$ millimeters. As the amount of ink deposited on the paper increases with the breadth of the strokes, it will be observed that for several of the strokes the ink has passed through the paper and becomes visible on the back of the paper. If for instance the paper remains white under the fourth stroke and is stained under the fifth stroke, the sizing of that paper can be represented by $\frac{4}{5}$, for a determined thickness of the paper. The degree of sizing of a paper being besides proportional to the thickness (or to the weight per square meter), all other things remaining unvaried, it will be better to write under this expression, as a denominator, the weight of the square meter of the paper tested, so as to obtain an exact and comparable expression of the degree of sizing of the paper. If for instance the weight of the paper is 60 grams for a square meter, its degree of sizing can be expressed by: $\frac{4/5}{60}$ The main advantages of the apparatus are: uniformity in the relative speeds of movement between the drawing-pens and the paper, in the pressure exerted by the drawing-pens on the paper, in the amount of ink deposited, in the increase of the breadth of the strokes. Consequently the results of several tests can be compared, provided an ink of known characteristics is used.

What I claim is:

1. Apparatus for testing the sizing of paper, comprising a board adapted to receive the paper to be tested, a frame, a series of drawing-pens supported by said frame, the spaces between the points of said drawing-pens increasing from one end of the series to the other end, and a device for producing a relative movement between said frame and said board.

2. Apparatus for testing the sizing of paper, comprising a board adapted to receive the paper to be tested, a frame, a shaft rotatably supported in said frame, a drawing-pen supported by said shaft, an adjustable weight associated with said pen for pressing it against the paper, and a device for producing a relative motion between said frame and said board.

3. An apparatus for testing the sizing of paper, comprising a board adapted to receive the paper to be tested, a frame, a shaft rotatably supported in said frame, a drawing-pen supported by said shaft, an adjustable weight associated with said pen for pressing it against the paper, a lifting bar for raising said pen, an operating lever connected to said lifting bar, and a device for producing a relative motion between said frame and said board.

4. Apparatus for testing the sizing of paper, comprising a board adapted to receive the paper to be tested, a frame, a shaft rotatably supported in said frame, a drawing pen supported by said shaft, an adjustable weight associated with said pen for pressing it against the paper, a lifting bar for raising said pen, an operating lever connected to said lifting bar, a device for producing a relative movement between said frame and said board, and means operative upon said bar for automatically raising the drawing-pen at the end of said motion.

5. An apparatus for testing the sizing of paper, comprising a board adapted to receive the paper to be tested, a reciprocatory drawing-pen supporting frame, a spring motor, means for holding said motor against operation, means for releasing said holding means, said motor being tensioned by the movement of the board in one direction and drawing the board in the other direction when said holding means is released, and means for regulating and slackening the motion of the board when drawn by the spring motor.

6. Apparatus for testing the sizing of paper, comprising a board adapted to receive paper to be tested, a reciprocatory drawing-pen supporting frame, a spring motor, means for holding said motor against operation, means for releasing said holding means, said motor being tensioned by the movement of the board in one direction and drawing the board in the other direction when said holding means is released, a rack secured to the board, a gear in mesh with said rack, a speed slackening device actuated by said gear, a ratchet wheel actuated by said gear, a spring pawl in engagement with said ratchet wheel, and means for disengaging said pawl from said ratchet wheel.

7. Apparatus for testing the sizing of paper, comprising a board adapted to receive paper to be tested, a supporting frame, a device for producing a relative movement between said frame and said board, a drawing-pen comprising two points fixed at a constant distance from each other, and an ink reservoir connected with the pen and located above said points.

In testimony whereof I affix my signature in presence of two witnesses.

JOSEPH DENOËL.

Witnesses:
 EUGÈNE DRYON,
 LEONARD LÆVA.